(12) United States Patent
Vintola et al.

(10) Patent No.: US 10,834,625 B2
(45) Date of Patent: Nov. 10, 2020

(54) CARRIER AGGREGATION CAPABILITY SIGNALING

(71) Applicant: Qualcomm Incorporated, San Diego, CA (US)

(72) Inventors: Timo Ville Vintola, San Diego, CA (US); Shrenik Patel, San Diego, CA (US); Peter Gaal, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/059,991

(22) Filed: Aug. 9, 2018

(65) Prior Publication Data
US 2019/0053091 A1 Feb. 14, 2019

Related U.S. Application Data

(60) Provisional application No. 62/543,814, filed on Aug. 10, 2017.

(51) Int. Cl.
*H04W 28/02* (2009.01)
*H04L 5/00* (2006.01)
*H04W 28/06* (2009.01)
*H04W 72/04* (2009.01)

(52) U.S. Cl.
CPC ......... *H04W 28/0215* (2013.01); *H04L 5/001* (2013.01); *H04L 5/003* (2013.01); *H04L 5/005* (2013.01); *H04L 5/0053* (2013.01); *H04L 5/0094* (2013.01); *H04W 28/065* (2013.01); *H04W 72/0453* (2013.01)

(58) Field of Classification Search
CPC ............ H04W 28/0215; H04W 28/065; H04L 5/0094; H04L 5/003; H04L 5/0053
See application file for complete search history.

(56) References Cited

U.S. PATENT DOCUMENTS

| 2013/0028236 A1* | 1/2013 | Jung ................. H04W 36/0072 370/331 |
| 2015/0173009 A1 | 6/2015 | Vallath et al. |
| 2017/0195998 A1* | 7/2017 | Zhang .................... H04B 7/086 |

FOREIGN PATENT DOCUMENTS

WO 2015113233 A1 8/2015

OTHER PUBLICATIONS

International Search Report and Written Opinion—PCT/US2018/046326—ISA/EPO—dated Jan. 22, 2019.
(Continued)

*Primary Examiner* — Mohammad S Anwar
(74) *Attorney, Agent, or Firm* — Linda G. Gunderson

(57) ABSTRACT

Methods, systems, and devices for wireless communication are described. Techniques to use capability information for user equipment in wide band systems such as millimeter wave systems. The capability information can include information indicative of support for limited non-contiguous intra-band carrier aggregation. The capability information can include information indicative of support for sharing time and frequency tracking information between cells.

18 Claims, 9 Drawing Sheets

(56) References Cited

OTHER PUBLICATIONS

Qualcomm Incorporated: "Further Discussion on Carrier Aggregation Bandwidth Combination", 3GPP Draft; R4-121542, 3rd Generation Partnership Project (3GPP), Mobile Competence Centre ; 650, Route Des Lucioles ; F-06921 Sophia-Antipolis Cedex ; France, vol. RAN WG4, No. Jeju Island, Korea, Mar. 19, 2012 (Mar. 19, 2012), XP050613271, 5 Pages, [retrieved on Mar. 19, 2012], p. 4, Table 5.6A.-1-2A.

Qualcomm Incorporated: "Support for non-adjacent carrier operation in MC-HSDPA", 3GPP Draft; R2-113072 UE Radio Access Capability Extension, 3rd Generation Partnership Project (3GPP), Mobile Competence Centre ; 350, Route Des Lucioles ; F-06921 Sophia-Antipolis Cedex ; France, vol. RAN WG2, No. Barcelona, Spain; May 9, 2011, May 3, 2011 (May 3, 2011), XP050495319, 3 Pages, [retrieved on May 3, 2011], p. 1, section 2.

"3rd Generation Partnership Project; Technical Specification Group Radio Access Network; Feasibility study for Further Advancements for E-UTRA (LTE-Advanced) (Release 9)", 3GPP Draft; RT-090052, 3GPP TR 36.912 V2.0.0, 3rd Generation Partnership Project (3GPP), Mobile Competence Centre ; 650, Route Des Lucioles ; F-06921 Sophia-Antipolis Cedex ; France, Feb. 7, 2011 (Feb. 7, 2011), XP050919066, 53 Pages, Retrieved from the Internet: URL:http://www.3gpp.org/ftp/tsg_ran/AHG1_ITU_Coord/TSGRT_ALL/TSGRT_2009/ [retrieved on Feb. 7, 2011], p. 20, Figure11.3.2.1-1.

\* cited by examiner

CARRIER AGGREGATION CAPABILITY SIGNALING

CLAIM OF PRIORITY UNDER 35 U.S.C. § 119

The present Application for Patent claims priority to Provisional Application No. 62/543,814, entitled "CARRIER AGGREGATION CAPABILITY SIGNALING" filed Aug. 10, 2017, and assigned to the assignee hereof and hereby expressly incorporated by reference herein.

BACKGROUND

The following relates generally to wireless communication, and more specifically to capability signaling for carrier aggregation (CA).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless communications systems may use different frequency bands for communication. Some bands may be subject to license in the geographic region in which a user is operating a device, and some bands may be permanently or temporarily designated as unlicensed.

In order to provide more and better wireless services, use of spectrum in higher frequencies is being explored. For example, use of portions of the millimeter wave (mmW) spectrum (which extends from 30 GHz to 300 GHz), is being considered for telecommunications applications. Within the mmW spectrum, different bands are being defined. For any particular band, one or more portions may be allotted to a service provider or other entity to be used for telecommunications among devices associated with the service provider.

SUMMARY

Methods, systems, and devices for wireless communication are described. The techniques allow for carrier aggregation in higher frequency portions of the electromagnetic spectrum, such as the millimeter wave regime.

In one aspect, a method of wireless communication performed by a user equipment (UE) comprises generating information indicative of support for limited non-contiguous intra-band carrier aggregation, wherein the support for the limited non-contiguous intra-band carrier aggregation is support for a limited frequency range W less than the range L of a particular frequency band, and communicating the information indicative of the support for limited non-contiguous intra-band carrier aggregation to one or more network entities. The information indicative of the support for limited non-contiguous intra-band carrier aggregation may comprise an indication of a magnitude of the limited frequency range, an indication that a pre-defined frequency range is supported, an indication of a number of receive processing chains included in transceiver circuitry of the UE, or a combination. The indication of a magnitude of the limited frequency range may be an indication of a frequency separation between a lower frequency of a supported lowest component carrier and an upper frequency of a supported highest component carrier in the particular frequency band. The indication of the number of receive processing chains included in the transceiver circuitry of the UE may be an indication that the number is less than a number to provide support for full intra-band carrier aggregation support, wherein support for full intra-band carrier aggregation is support for the range L of the particular frequency band.

In some implementations, communicating the information indicative of the support for limited non-contiguous intra-band carrier aggregation comprises transmitting the information in a Radio Resource Control (RRC) message to a first cell associated with a first base station. The method may further comprise subsequently communicating with the first cell using a first component carrier and communicating with a second cell using a second different component carrier, wherein the first component carrier and the second different component carrier span a frequency range less than or equal to the limited frequency range.

In some implementations, communicating the information indicative of the support for limited non-contiguous intra-band carrier aggregation comprises transmitting the information in a control message to a first cell associated with a first base station, wherein the first base station is associated with a service provider with at least a first spectrum allotment and a second spectrum allotment separated by a frequency gap G greater than W. The method may further comprises receiving an indication of one or more assigned component carriers from the first cell, wherein the one or more assigned component carriers are all included in the first spectrum allotment, communicating with at least the first cell using the one or more assigned component carriers included in the first spectrum allotment, communicating with a different cell associated with a different base station after a handoff procedure, and receiving an indication of one or more assigned component carriers from the different cell, wherein the one or more assigned component carriers are all included in the second spectrum allotment.

In some implementations, a minimum component carrier frequency width is S, wherein a frequency gap between the first spectrum allotment and the second spectrum allotment is G, and wherein W is equal to or greater than G+2S but less than a frequency range R spanned by the first spectrum allotment and the second spectrum allotment, and the method further includes receiving an indication of one or more assigned component carriers associated with at least a first cell and a second cell, wherein the one or more assigned component carriers include at least one assigned component carrier from the first spectrum allotment and at least one assigned component carrier from the second spectrum allotment.

In general, in another aspect, a method of wireless communication performed by a user equipment (UE), comprises generating information indicating a capability of the UE to support sharing of time and frequency tracking information between at least a first component carrier for a first cell and a second component carrier for a second cell in a carrier aggregation communication process, wherein the time and frequency tracking information is information to track time, information to track frequency, or both. The information indicating the capability of the UE to support sharing of time and frequency tracking information between at least the first component carrier for the first cell and the second component carrier for the second cell can comprise an indication that the UE supports the second cell not transmitting an SS block. The method further comprises communicating the information indicative of the support for sharing of time and frequency tracking information to one or more base stations, receiving a signal from the first cell including a synchronization signal block (SS block) including time and frequency tracking information associated with the first cell, a tracking reference signal (TRS) including time and frequency tracking information associated with the first cell, or both, and determining time and frequency tracking information associated with the second cell using the time and frequency tracking information associated with the first cell.

The method may further comprise receiving a signal from the second cell not including an SS block, a TRS, or both, and processing the signal received from the second cell using time and frequency tracking information associated with the second cell determined using the time and frequency tracking information associated with the first cell.

The time and frequency tracking information associated with the first cell may include at least one information type selected from the group consisting of: information indicative of frequency offset for the first cell, information indicative of frequency spread for the first cell, information indicative of time offset for the first cell, and information of delay spread for the first cell.

In general, in another aspect, a user equipment (UE) includes memory circuitry configured to store capability information, the capability information including one or more types of capability information selected from the group consisting of: capability information indicative of support for limited non-contiguous intra-band carrier aggregation, wherein the support for the limited non-contiguous intra-band carrier aggregation is support for a limited frequency range W less than the range L of a particular frequency band; and capability information indicative of support for sharing of time and frequency tracking information between at least a first component carrier and a second component carrier. The UE also includes processor circuitry configured to access the memory circuitry to generate a communication of the capability information for transmission to one or more network entities, and transceiver circuitry and antenna circuitry to generate and transmit a signal to communicate the capability information. In some implementations, the transceiver circuitry and antenna circuitry are configured to generate and transmit a beamformed signal using a millimeter wave band.

The transceiver circuitry includes one or more receive chains, each of the one or more receive chains including a plurality of radiofrequency processing (RF) components. In some implementations, a single receive chain is configured to process received signals in one or more millimeter wave bands including a particular frequency band having a frequency range L, wherein the capability information includes at least capability information indicative of support for limited non-contiguous intra-band carrier aggregation, and wherein the support for the limited non-contiguous intra-band carrier aggregation is support for a limited frequency range W less than the frequency range L.

In some implementations, the one or more receive chains is a single receive chain configured to process received signals in one or more millimeter wave bands, and the capability information includes at least capability information indicative of support for sharing of time and frequency tracking information between at least a first component carrier and a second component carrier. The processor is configured to process a signal received from a first cell on the single receive chain to determine time and frequency tracking information for the first cell and to use the time and frequency tracking information for the first cell to process a signal received from the second cell.

In some implementations, the one or more receive chains is a single receive chain configured to process received signals in one or more millimeter wave bands, and the single receive chain is configured to separate a plurality of component carriers in baseband. The single receive chain may include a single analog to digital converter (ADC) with an associated supported bandwidth, and W is less than or equal to the supported bandwidth of the ADC.

In some implementations, a method of wireless communication at a base station comprises receiving capability information from a first user equipment (UE), wherein the capability information includes one or more types of capability information selected from the group consisting of: capability information indicative of support for limited non-contiguous intra-band carrier aggregation, wherein the support for the limited non-contiguous intra-band carrier aggregation is support for a limited frequency range W less than the range L of a particular frequency band; and capability information indicative of support for sharing of time and frequency tracking information between at least a first component carrier and a second component carrier. The method may further include, in response to receiving the capability information, determining one or more cells each associated with a component carrier for communication with the UE.

In some implementations, the capability information includes at least capability information indicative of support for limited non-contiguous intra-band carrier aggregation, wherein the support for the limited non-contiguous intra-band carrier aggregation is support for the limited frequency range W less than the frequency range L, and the capability information includes at least one indication selected from the group consisting of: an indication of a magnitude of the limited frequency range W, an indication that a pre-defined frequency range is supported, and an indication of a number of receive processing chains included in transceiver circuitry of the UE.

In some implementations, the base station is associated with at least a first spectrum allotment in the particular frequency band and a second spectrum allotment in the particular frequency band, and the method further includes, in response to determining that W is less than a gap between the first spectrum allotment and the second spectrum allotment, transmitting an assignment of a plurality of component carriers to the UE, wherein the plurality of assigned component carriers are all included in the first spectrum allotment or all included in the second spectrum allotment.

In some implementations, the capability information includes at least capability information indicative of support for sharing of time and frequency tracking information between at least a first component carrier associated with a first cell and a second component carrier associated with a second different cell, and the method further comprises transmitting a signal including time and frequency tracking information associated with the first cell and transmitting a signal on the second cell omitting at least some of the time and frequency tracking information associated with the second cell.

DETAILED DESCRIPTION

Figure 1:
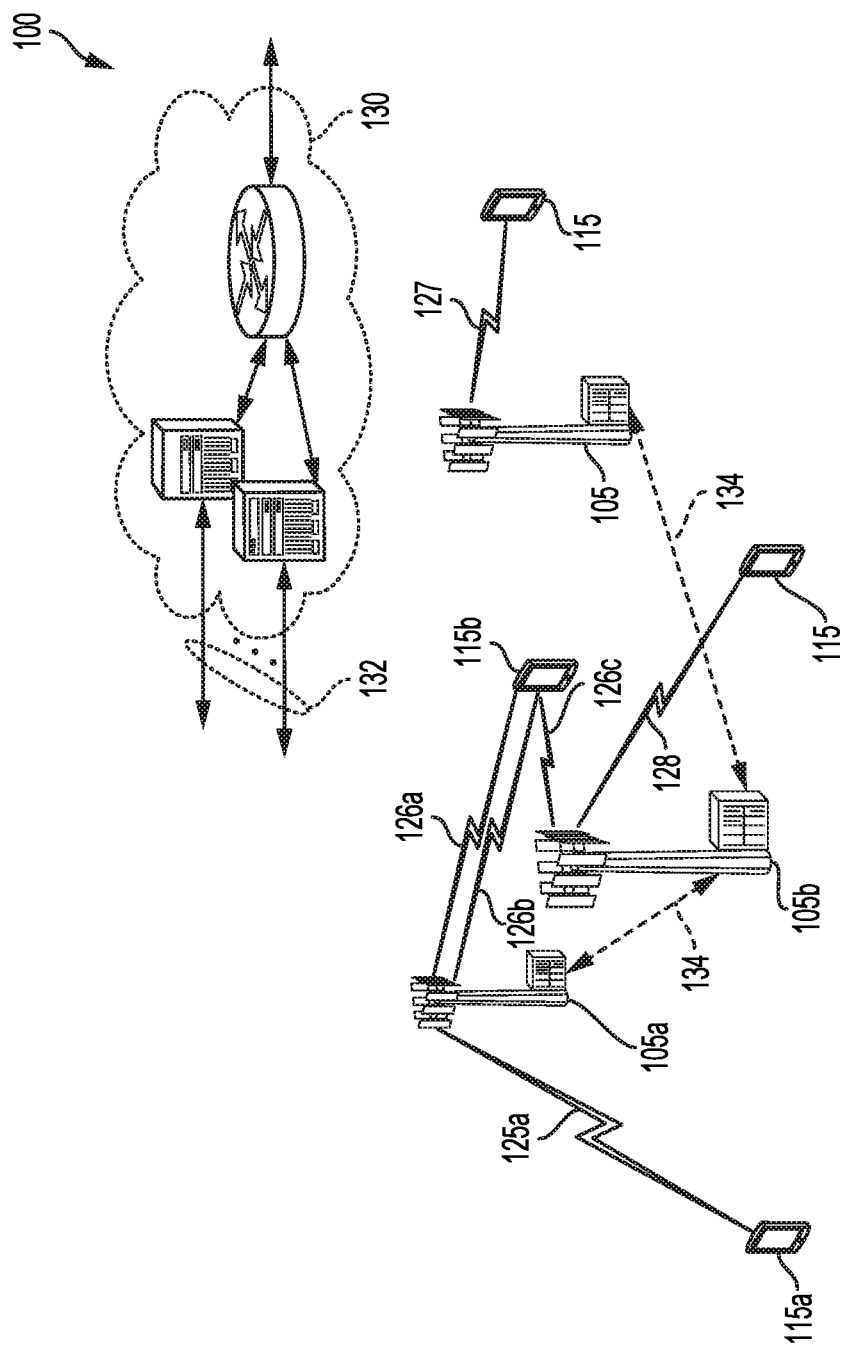
FIG. 1 illustrates an example of a wireless communications system according to some implementations.

While the expansion of telecommunications into new frequency regimes can provide a number of benefits, communication in wider frequency bands associated with mmW spectrum presents new challenges for devices and protocols. For example, implementation of techniques such as carrier aggregation may be challenging for the large bands being defined for mmW communications.

Carrier aggregation (CA) is a technique that allows wireless communication devices to communicate with greater bandwidth by aggregating more than one component carrier (CC). Depending on the capability of the user equipment (UE), network constraints, and/or other aspects, a variety of CA configurations can be used. For example, different configurations can be used on the uplink and downlink, and the component carriers need not be contiguous, have the same bandwidth, or come from the same carrier band.

Some currently proposed mmW bands that may be used for telecommunications include a 28 GHz band extending from 26.5 to 29.5 GHz and a 26 GHz band extending from 24.25 to 27.5 GHz, as well as a band extending from 37.6 to 40 GHz, with further band definition or modification possible. There is also unlicensed spectrum above 60 GHz. Some example component carrier widths considered for the mmW spectrum include 50 MHz, 100 MHz, 150 MHz, and 200 MHz. Aggregated bandwidth limits may also be defined for particular protocols. Example component carrier options currently being considered include (in MHz): (1) intra-band CA50+50 (non-contiguous), (2) intra-band CA 100+100 (non-contiguous), (3) intra-band CA 150+150 (contiguous and non-contiguous), (4) intra-band CA 100+200 (contiguous and non-contiguous), and (5) intra-band CA 200+200 (non-contiguous). Different or additional component carrier options may be defined/used; for example, options with three or more component carriers may be used.

Although using the mmW spectrum can provide much needed access to additional bandwidth for commercial telecommunications, a number of technical challenges accompany its use. One aspect that poses a challenge for device designers is the width of the bands compared with current defined bands for other technologies. For example, the 37.6 GHz to 40 GHz band spans 2.4 GHz, which is at least an order of magnitude greater than defined bandwidths for LTE (Long Term Evolution). The bands for the bands in the 24.25 to 29.5 GHz frequency ranges (the 26 GHz and 28 GHz bands discussed above) are even wider: 3.25 GHz and 3 GHz.

Additionally, a service provider may be allocated portions of an existing band that are non-contiguous and in their entirety (from the minimum frequency of the lowest frequency allotment to the maximum frequency of the highest frequency allotment) span a large portion of the bandwidth. For example, within a particular mmW band of frequency range L, some wireless service providers may have two or more frequency allocations that are not adjacent to one another. Since aggregating frequency resources used by a particular UE can provide faster data speeds, the service provider may want to use carrier aggregation; however not all UEs may be able to support carrier aggregation for the entire width of the spectrum allocated to a service provider. In particular, some UE designs for use in the mmW spectrum use a single receive chain for more than one component carrier rather than multiple receive chains for multiple component carriers as commonly found in LTE UEs. The single receive chain may be unable to process an entire spectrum allocation due to performance limits of RF components.

Another challenge with mmW signal processing is time and frequency tracking for multiple component carriers. For the example of a single receive chain, multiple component carriers are processed in one receive chain, and each component carrier will have some frequency offset and spread, time offset and delay spread, and the like. In order to address this challenge in an efficient way, some UEs may be designed with the capability to share time and/or frequency tracking information between cells.

In order to decode and demodulate signals according to performance goals, a UE may need to know all or some of time offset information, delay spread information, frequency offset information, and frequency spread information for a particular cell. In some implementations, a UE uses the time/frequency tracking information for one cell to decode and demodulate signals from the second cell, as explained in more detail below. If one or more network entities (e.g., base stations and/or other network apparatus) receives information indicating that the UE has the capability to share information from one cell with at least one additional cell, it can optionally omit some or all of that information from signaling with the other cell. If the other cell omits some information, more resources can be used for payload data transfer.

In order to better enable carrier aggregation, the UE may communicate its capabilities to the network (e.g., to one or more base stations and/or to a more central network resource). A UE with limited non-contiguous intra-band carrier aggregation support may communicate that capability to a network entity; for example, to a serving base station and/or other network apparatus, during a communication session or as part of a previous setup or communication session. A UE with limited non-contiguous intra-band carrier aggregation capabilities may subsequently communicate using carrier aggregation with the same or fewer component carriers than a UE that is capable of supporting the frequency range corresponding to the full band (full intra-band carrier aggregation support). A UE with the capability to share time/frequency tracking information between component carriers could enable the network to omit some information from signaling for one of the carriers while still meeting performance goals, which could improve data rates. These techniques are described more fully below.

FIG. 1 shows an example system 100 for wireless communication, including communication in the millimeter wave spectrum. Wireless communications system 100 includes base stations 105 (including base stations 105a and 105b), UEs 115 (including UE 115a and UE 115b), and a core network 130. In some examples, the wireless communications system 100 may be a Long Term Evolution (LTE)/LTE-Advanced (LTE-A) network, a 5G network, or a network that provides services with a combination of protocols. In the example of FIG. 1, UE 115a is capable of limited non-contiguous intra-band carrier aggregation in a wide band (greater than 1 GHz) implementation, such as a band of the mmW spectrum. By contrast, UE 115b is capable of full non-contiguous intra-band carrier aggregation in a wide band environment. UEs 115a and/or 115b may also be capable of time/frequency tracking sharing.

Base stations 105a and 105b may wirelessly communicate with UEs 115 that are within their communication range. Generally, a particular base station 105 communicates with stationary or mobile UEs 115 that are associated with a particular service provider, although service may be provided on an emergency basis or other exception to other devices. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs) 105.

Depending on the circumstances and its capabilities, a UE 115 can communicate with a single physical base station or multiple physical base stations, using a single carrier or more than one component carrier. In the example of FIG. 1, a first UE 115a communicates with a cell of base station 105a over single component carrier 125a. The use of the terms cell and component carrier are sometimes used interchangeably, but herein the phrase "base station" refers to the physical base station, the term "cell" is used as a structural term to refer to the apparatus of a base station to support a logical communication entity used for communication with a UE 115, and the term "component carrier" is used to refer to the particular carrier used by a cell. UE 115b of FIG. 1 is shown communicating with a cell associated with base station 105a using a first component carrier 126a (which may be the same carrier used for UE 115a in some circumstances, or may be different). UE 115b also communicates with a different cell of base station 105a using a different component carrier 126b, and with a cell associated with a different base station 105b using a third component carrier 126c. Other UEs may communicate with one or more base stations 105 using additional or different carriers such as component carrier 127 or 128.

Figure 2:
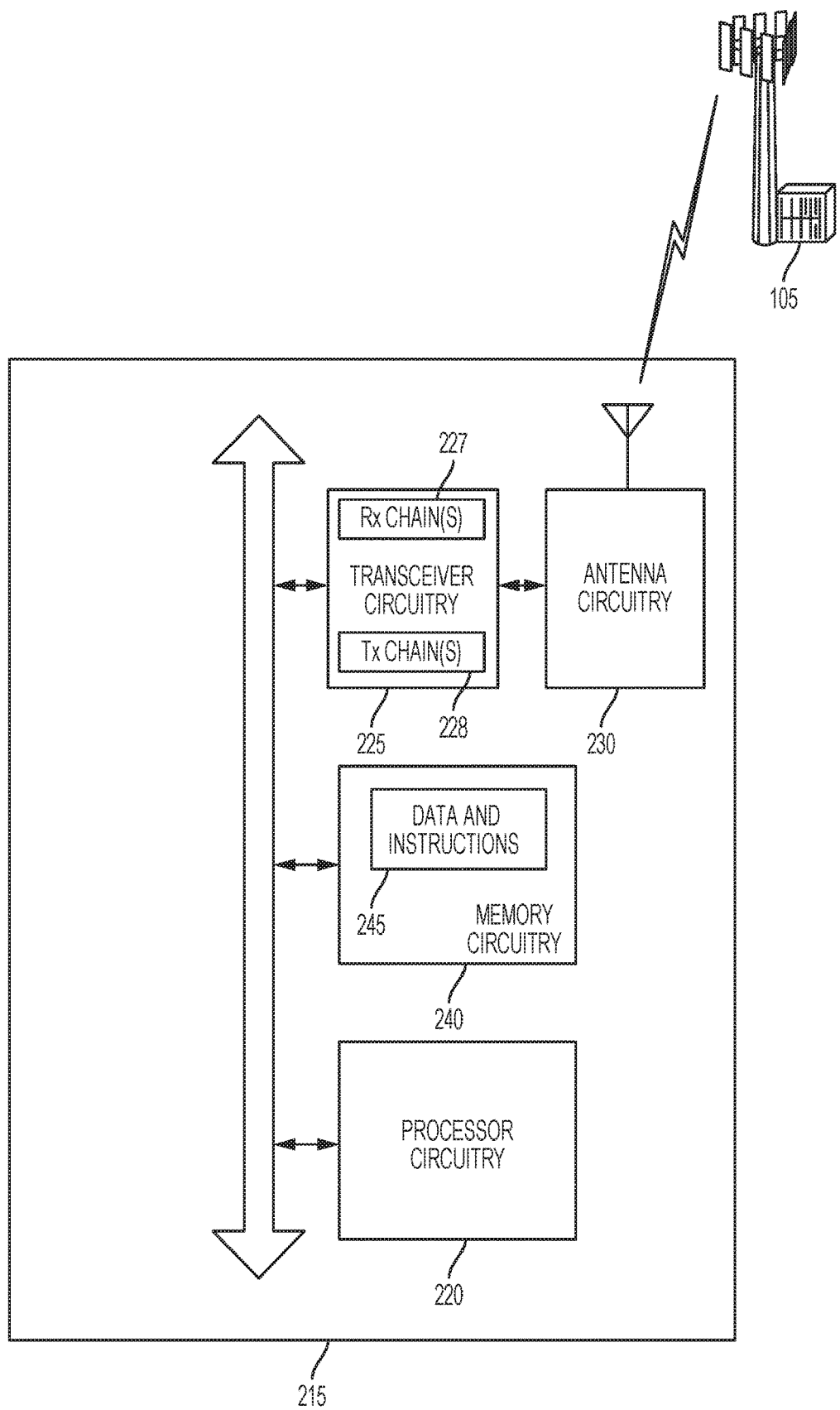
FIG. 2 illustrates an example of a wireless device according to some implementations.

FIG. 2 shows a simplified drawing of an example UE 215. UE 215 includes antenna circuitry 230, transceiver circuitry 225, one or more receive (Rx) chains 227 having RF components such as amplifiers, analog to digital converters, mixers, oscillators, filters, etc. for processing received downlink signals, as well as one or more transmit (TX) chains 228 including RF components to generate signals to transmit on the uplink). For a particular design, a particular receive chain may be able to process signals having a particular frequency range W. UE 215 includes processor circuitry 220 and memory circuitry 240. Processor circuitry 220 and memory circuitry 240 are shown as discrete blocks, but may be implemented in a number of ways; for example, processor circuitry may be implemented in one or more dedicated areas of a chip or in different chips. Similarly memory circuitry 240 may be implemented as a main memory with or without the addition of other portions of memory circuitry on the same or different chips. For communications in the mmW spectrum, antenna circuitry 230 works with processor circuitry 220 and memory circuitry 240 to implement beam-related techniques such as beam scanning and management for communication with one or more base stations such as base station 105. Note that herein "processor circuitry" is used to refer to structure.

UE 215 may store capability information as part of stored data and instructions 245 in memory circuitry 240. As noted above, UE capability information may indicate support for limited non-contiguous intra-band carrier aggregation, and/or support for time and frequency tracking information sharing between component carriers, as well as other kinds of capabilities. For simplicity, the phrase "time and frequency tracking information" is used to refer to information to track time, information to track frequency, or both. During communication with a cell or cells, processor circuitry 220 may access capability information stored on memory circuitry 240 and generate signal information to be transmitted during control signaling. The signal may be transmitted to one or more network entities such as base station 105 using transceiver circuitry 225 and antenna circuitry 230.

Figure 9A:
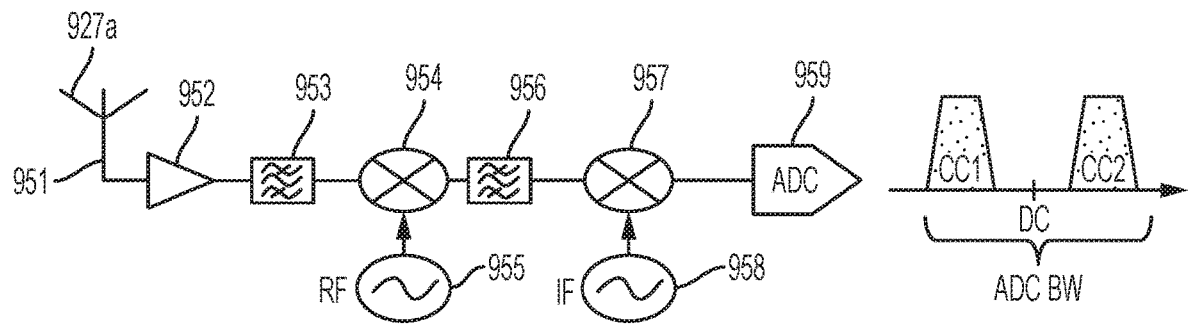
FIGS. 9A, 9B, and 9C illustrate example receive chains according to some implementations.
Figure 9B:
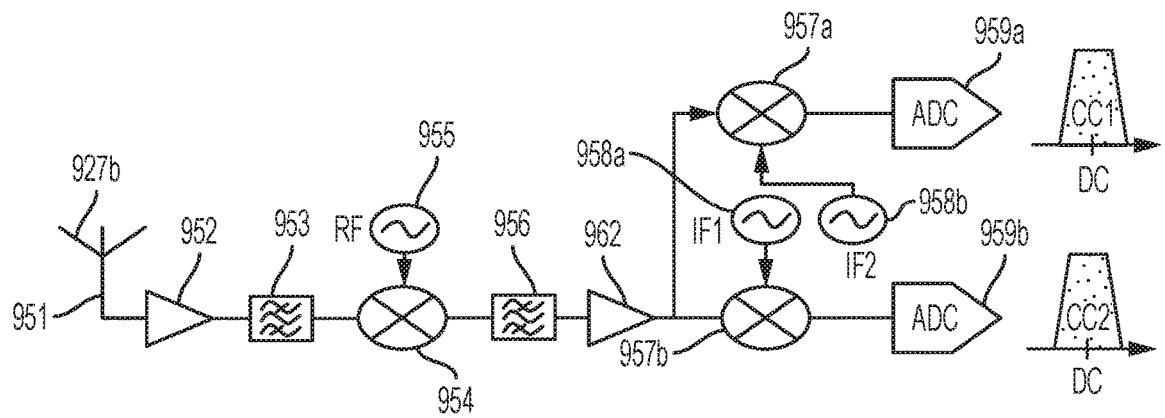
Figure 9C:
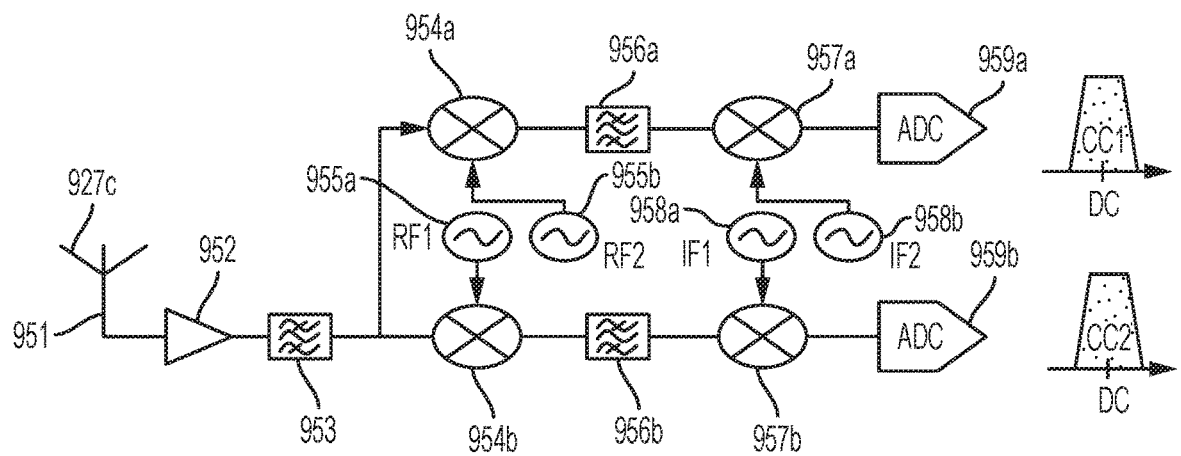

FIGS. 9A to 9C show examples of receive chains that can be used in a UE 115. FIG. 9A shows a single receive chain 927a that may be used to process a signal with multiple component carriers, where component carriers are separated in baseband. In FIG. 9A an incoming signal 951 is first amplified by amplifier 952 to generate signal 953 that includes a plurality of component carriers; in this example a first component carrier CC1 and a second component carrier CC2. Signal 953 is mixed with the output of an RF oscillator 955 using mixer 954 to generate signal 956. Signal 956 is mixed with the output of an IF (intermediate frequency) oscillator 958 using mixer 957, and its output is converted using ADC (analog to digital converter) 959 to separate CC1 and CC2. As shown in FIG. 9a, the width of the separated carriers can be limited by the bandwidth of the ADC or other baseband components. The bandwidth of the baseband components such as the ADC should be at least equal to the maximum channel bandwidth. Currently, this is 400 MHz, but values up to 1200 MHz have been proposed. If the ADC has an associated supported bandwidth, the supported limited frequency range W associated with the UE is less than or equal to the associated supported bandwidth.

FIG. 9B shows an example of a two path receive chain 927b that may be used to process a signal with multiple component carriers, where component carriers are separated in IF. In FIG. 9B an incoming signal 951 is first amplified by amplifier 952 to generate signal 953 that includes a plurality of component carriers; in this example a first component carrier CC1 and a second component carrier CC2. Signal 953 is mixed with the output of an RF oscillator 955 using mixer 954 to generate signal 956. Signal 956 amplified using amplifier 962 whose output is split. The signal is mixed with the output of IF oscillators 958a and 958b using mixers 957a and 957b (respectively), and their output is converted using ADCs 959*a* and 959*b*. In this implementation, CC1 and CC2 are separated in IF rather than in baseband. Since the component carrier separation occurs before downconversion to DC, the separation is only limited by the bandwidth of the IF and RF components such as the LNA (low noise amplifier) and IF filter.

FIG. 9C shows an example of a different two path receive chain 927*c* that may be used to process a signal with multiple component carriers, where component carriers are separated in RF. In FIG. 9C an incoming signal 951 is first amplified by amplifier 952 to generate signal 953 that includes a first component carrier CC1 and a second component carrier CC2. Signal 953 is split and mixed with the output of RF oscillators 955*a* and 955*b* using mixers 954*a* and 954*b* to generate signals 956*a* and 956*b*. Signals 956*a* and 956*b* are mixed with the output of IF oscillators 958*a* and 958*b* using mixers 957*a* and 957*b* (respectively), and their output is converted using ADCs 959*a* and 959*b*. In this implementation, CC1 and CC2 are separated in IF rather than in baseband. Since the component carrier separation is in RF, the separation is only limited by bandwidth of the RF components. Note that additional elements may be included but are not shown in FIGS. 9A to 9C (e.g., signal conditioning elements, etc.).

Figure 3:
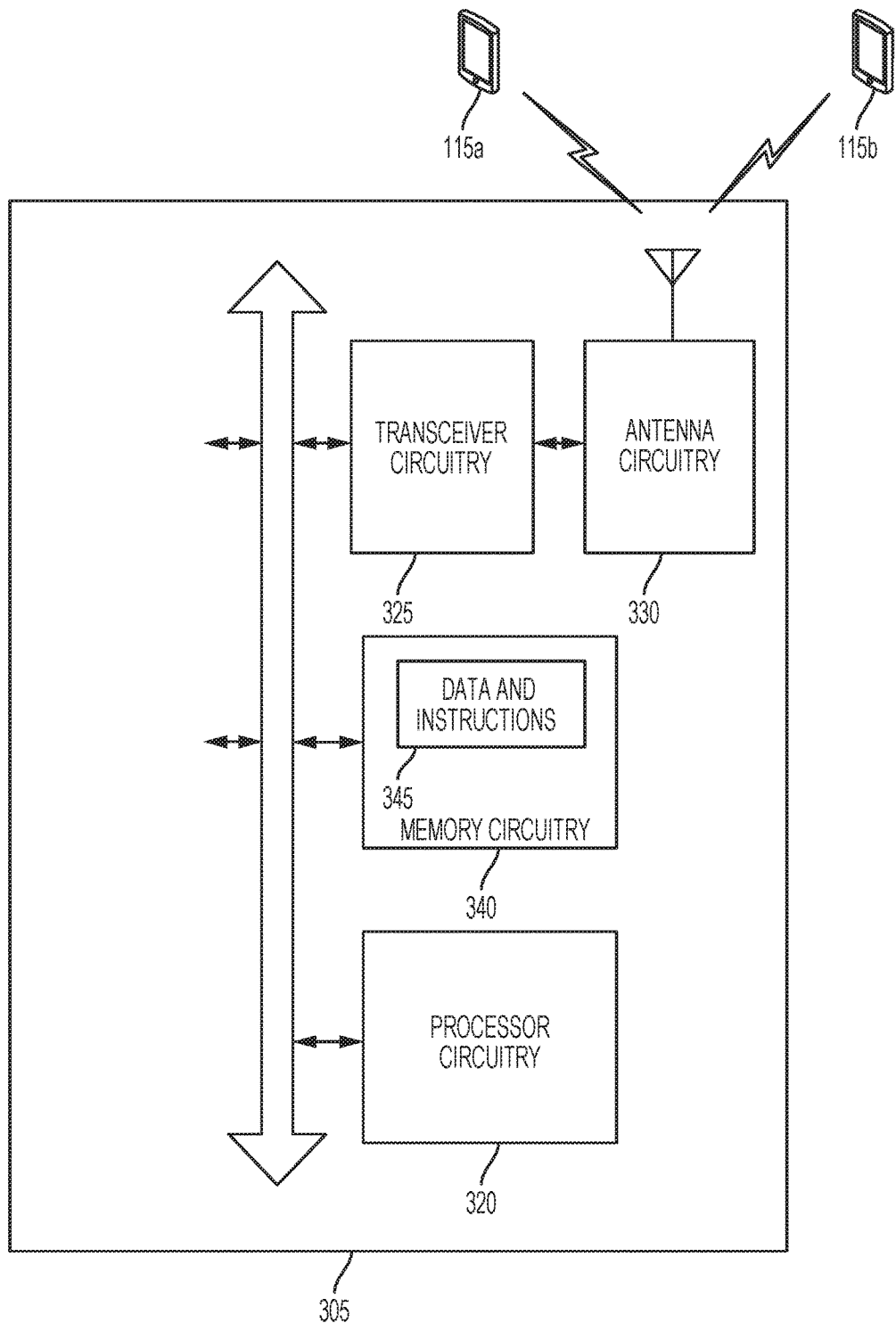
FIG. 3 illustrates an example of a base station according to some implementations.

FIG. 3 shows a simplified drawing of an example base station 305. Base station 305 may include processor circuitry 320, memory circuitry 340, antenna circuitry 330, and transceiver circuitry 325. As noted above, base station 305 can participate in communications with UEs such as UE 115*a* and UE 115*b* on a number of component carriers using associated cells. Here, the term "cell" being used to denote structure such as instructions stored on memory circuitry 340 to generate signal information upon execution by processor circuitry 320, and transceiver circuitry 325 and antenna circuitry 330 transmitting the signals using the particular component carrier associated with the cell.

Figure 4A:
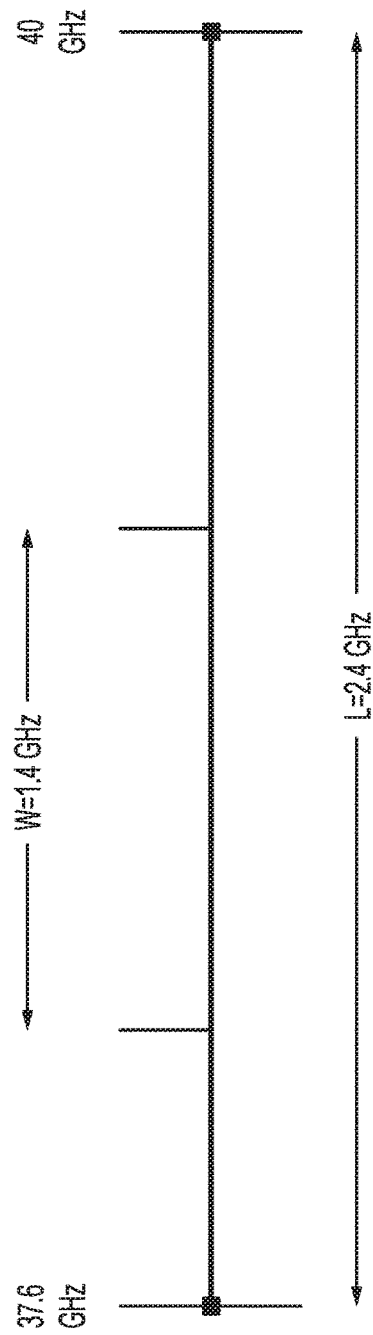
FIGS. 4A and 4B illustrates example spectrum allocations and supported frequency ranges within a wide band such as a band in the millimeter wave spectrum.
Figure 4B:
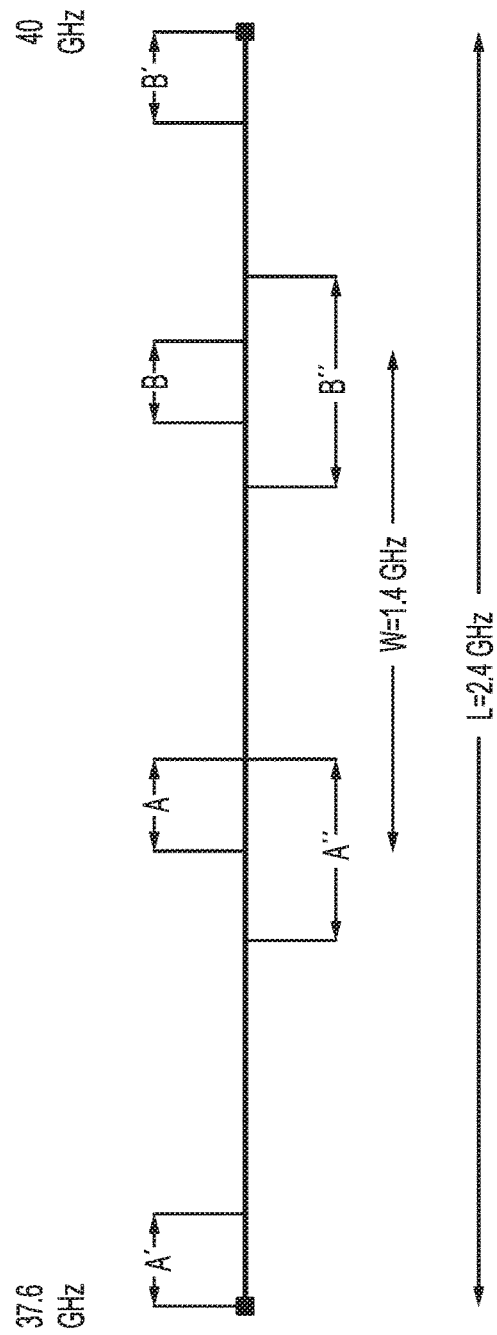

FIG. 4A shows an example of a frequency band in the mmW spectrum that may be used for communications. The frequency band extends from 37.6 GHz to 40 GHz, for a full frequency range L of 2.4 GHz. FIG. 4A also shows an example limited frequency range W of 1.4 GHz that may be enabled for a particular UE design (for example, a UE with a single receive chain). FIG. 4B shows three examples of available spectrum for carrier aggregation associated with a particular service provider related to a supported limited frequency range W associated with a particular UE. In the first example, a service provider may be able to use two non-contiguous allotments A and B of the 37.6 GHz to 40 GHz band whose total range is less than or equal to the limited frequency range W. In the second example, a service provider may be not able to use component carriers from two discontinuous allotments A' and B' since the gap between the allotments greater than the limited frequency range W associated with a particular UE. In the third example, the limited frequency range W is greater than the distance between allotments A" and B" by at least twice the minimum component carrier size S (currently 50 MHz) but not large enough to embrace the entire width of both allotments. Note that if one or more of the allotments has a larger minimum component carrier size than the overall minimum component carrier size, the range would be extended to embrace the minima of the associated allotments. Although FIGS. 4A and 4B show two spectrum allotments, different numbers of segments may be allocated. In implementations where a particular service provider has three or more non-contiguous allotments, with gaps of the same or different size between allotments, the techniques below can be generalized to use for particular pairs of allotments or for three or more allotments. Additionally, the supported range W can take a variety of values other than 1.4 GHz. For example, receive chain designs support values of at least 500 MHz (the current minimum channel bandwidth), up to values in the GHz range but less than the width of the defined band. For example receive chain designs with values of W between 1 GHz and 2 GHz may provide a desirable balance of component cost and ability to process a large portion of the band with a single receive chain.

Figure 5:
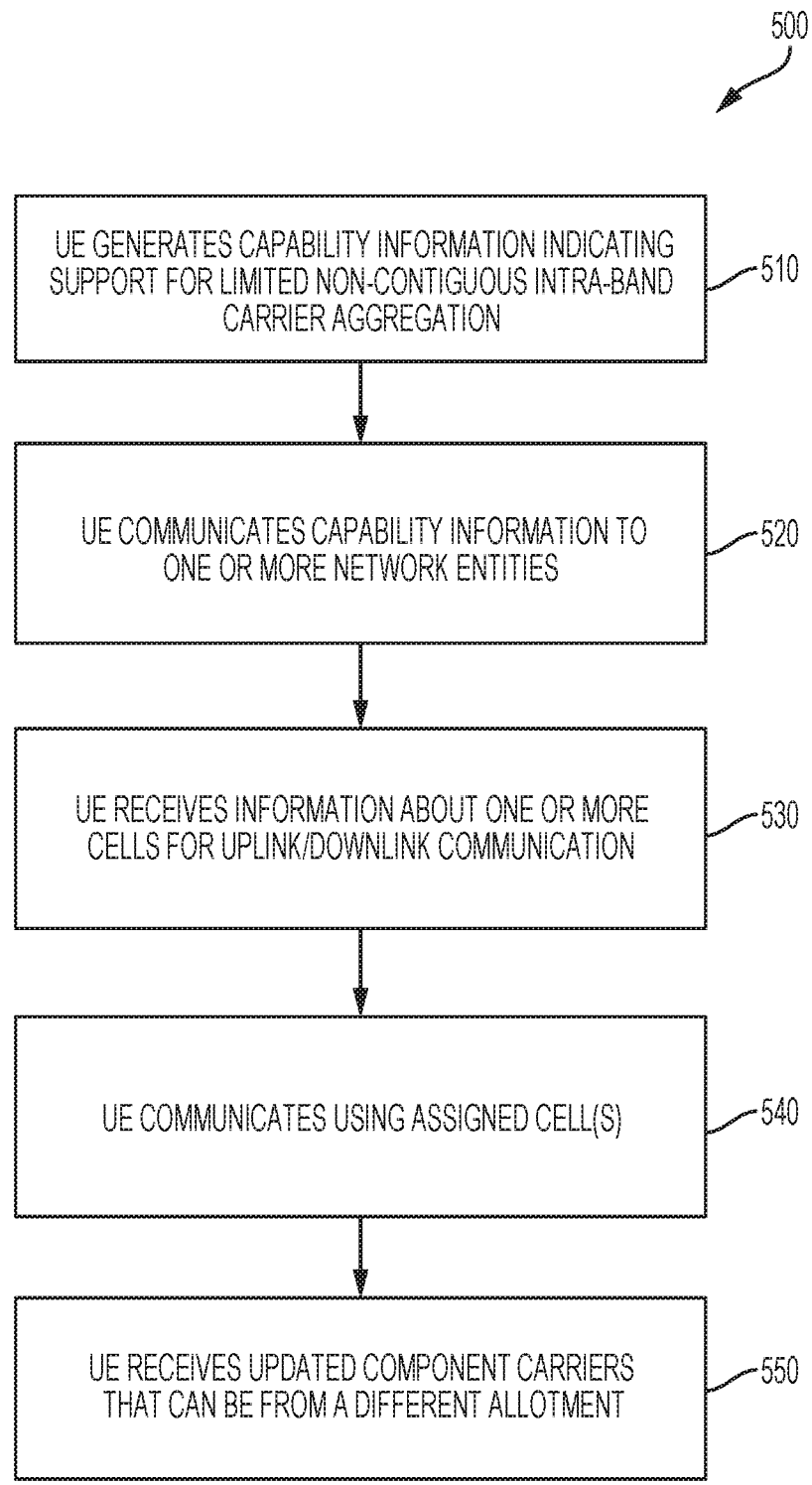
FIG. 5 illustrates an example method for a UE according to some implementations.

FIG. 5 shows a process 500 at a UE such as UE 115, 215 that can be used to enable communication of support for limited non-contiguous intra-band carrier capability. At 510, a UE that supports limited (less than full) non-contiguous intra-band carrier aggregation in a wide frequency band generates capability information indicative of its support. This information may include an indication that the UE supports non-contiguous carrier aggregation (where component carriers need not be adjacent to one another), and an indication of a limited frequency range W that is supported. In some implementations, the indication of limited frequency range support may serve as an implicit indication that the UE supports non-contiguous carrier aggregation. The wide frequency band may be one of the bands in the mmW spectrum, such as a band extending from 26.5 to 29.5 GHz, a band extending from 24.25 to 27.5 GHz, a band extending from 37.6 to 40 GHz, portions of the spectrum above 60 GHz, or other band.

There are a number of possible implementations for indicating support of limited non-contiguous intra-band carrier capability. In one implementation, a supported frequency range may be indicated. For the above example, the magnitude of the supported range, 1.4 GHz, may be indicated. More generally, for the receive chain 927*a* of FIG. 9A, the supported range may be based on the bandwidth of the ADC. In another implementation, one or more supported range magnitudes may be pre-defined, and the indication may be that the pre-defined range is available. The pre-defined range may be a single value (e.g., 1 GHz, 1.4 GHz, 1.5 GHz, or any defined amount), or may be a pre-defined sub-units so that an indication of the number of sub-units is an indication of the supported frequency range. E.g., a sub-unit may be 100 MHz, 200 MHz, or other amount. For the example of a 1.4 GHz supported range, the indication may be that a particular sub-unit is supported (1.4 GHz or less), or that more than one sub-units is supported (e.g., three 400 MHz sub-units, two 500 MHz sub-units, etc.) For the example of FIG. 9A, the number of sub-units would correspond to a range less than the bandwidth of the ADC. Alternately, an indication of the number of receive chains may be used, where for a particular design a single receive chain would be associated with a particular range W. For example, the indication may be a bit that indicates either a single receive chain or more than one receive chains. For the example of FIG. 9A, the indication would be an indication for a single receive chain.

At 520, the UE may communicate the capability information to one or more network entities. The UE may communicate the information to a base station as part of a connection protocol (for example, as part of control messaging such as Radio Resource Control (RRC) messaging). In some implementations, the information may be provided to the base station(s) through a network resource that includes stored information about the UE's capabilities.

At 530, the UE may receive information about one or more cells for downlink and/or uplink communications. If the UE had indicated support for full intra-band carrier aggregation, the one or more component carriers could include at least one component from each spectrum allotment, even if there were spectrum allotments located at different ends of the band. However, since the UE supports limited non-contiguous intra-band carrier aggregation, the one or more component carriers could be constrained to either the first spectrum allotment or the second spectrum allotment, depending on the supported frequency range and the particular configuration of the spectrum allotments.

Referring again to FIG. 4B, for a first spectrum allotment A and a second spectrum allotment B, the UE could communicate using carrier aggregation with component carriers from either or both of the allotments since W is greater than the total range of the spectrum allotments A and B. However, for the example of a first spectrum allotment A' and a second spectrum allotment B', the UE could communicate using carrier aggregation with one or more component carriers from A' or B', but not both, since W is less than the gap between the two spectrum allotments. For the example of a first spectrum allotment A" and a second spectrum allotment B", with W greater the gap by at least two allowed component carrier widths, the system could be set up so that the UE is only assigned component carriers from one of the allotments, for ease of use. However, it would be possible to design the system so that the UE could communicate using component carriers in both spectrum allotments, but restricted to the higher frequencies in allotment A" (e.g., the highest 50 MHz, 100 MHz, etc) and the lower frequencies in allotment B" so that the component carriers assigned to the UE all fall within its supported range W. For three or more allotments, the analysis is similar; if W is greater than the range of all the allotments, the UE may be assigned component carriers from any allotment; if W is less than the gap between any pair of allotments, the UE can only be assigned component carriers from a single allotment; and for other values of W the UE may be assigned component carriers that fall within the supported range W.

At 540, the UE communicates using the assigned cell(s). The UE may be assigned a single cell within the available allotments; that is, it may not use carrier aggregation for that communication because of the availability of component carriers. The UE may be assigned two or more cells for carrier aggregation, which may be contiguous or non-contiguous, but which are contained within frequency range W.

In some implementations of limited non-contiguous intra-band carrier support, at different times the actual assigned range can be changed from one portion of the spectrum to another. For example, after communicating with the cells as described above, the UE may connect with a cell associated with a different base station as part of a handover process. As part of the handover, the UE may exchange control signaling (e.g., RRC signaling) that includes its capabilities. In response, at 550, the UE may receive updated component carriers, where the updated component carriers can optionally come from different frequency allotments than the previous component carriers. For example, if W were less than each of the gaps between allotments, the UE would still be assigned component carriers within a single allotment, but it may be a different allotment. Referring to the example of FIG. 4B, if the UE were assigned carriers in allotment A prior to handover, it may be assigned carriers in allotment B after the handover. In response to the assignment, the UE tunes to the receive chain(s) to the new frequency allotment and subsequently communicates using the new component carriers.

Figure 6:
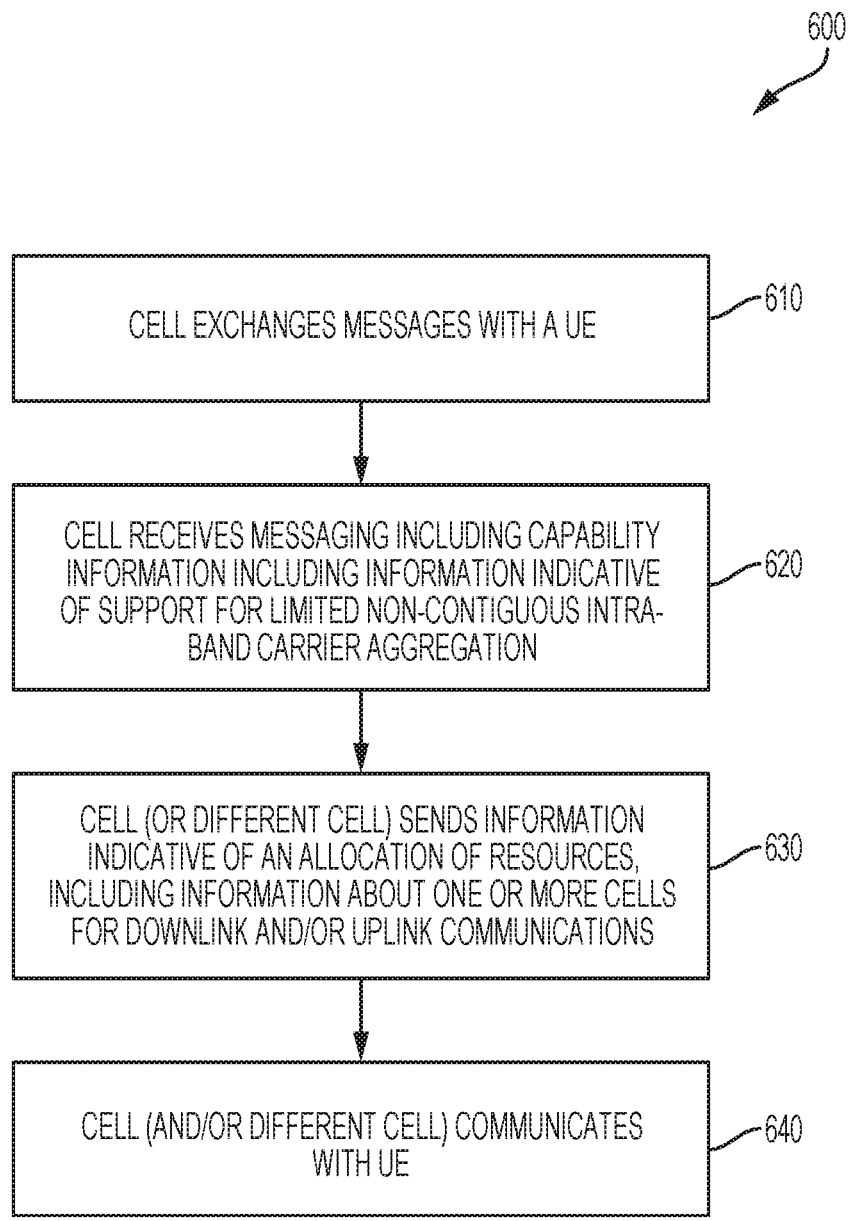
FIG. 6 illustrates an example method for a base station according to some implementations.

FIG. 6 shows a process 600 that can be used at base stations 105 such as base stations 105a and 105b of FIG. 1 or base station 305 of FIG. 3 to enable communication with one or more UEs 115 that have full or limited non-contiguous intra-band carrier aggregation capability. Base station 105a is associated with a service provider that has two or more non-contiguous spectrum allotments of a wide band (1 GHz or more) such as a band in the mmW spectrum. At 610, a cell associated with base station 105a exchanges messages with a UE such as first UE 115a of FIG. 1. For example, the cell and UE 115a may use signaling according to one or more control protocols such as Radio Resource Control (RRC) signaling. At 620, the cell receives one or more messages that includes capability information for UE 115a. For UE 115a, the capability information includes information indicative of support for limited non-contiguous intra-band carrier aggregation. In some implementations, base station 105a may be able to access capability information for UE 115a independent of the communication of the information as part of signaling between UE 115a and base station 105a. For example, base station 105a may be able to access capability information from other network apparatus via a backhaul or other communication path.

Based on the capability information associated with UE 115a, the spectrum allotments A and B (and additional allotments if applicable), and existing resource use, at 630 a cell of base station 105a (or optionally a different base station) sends UE 115 information indicative of an allocation of resources, including information about one or more cells for downlink and/or uplink communications. If the supported limited non-contiguous intra-band frequency range W that is less than the gap between the spectrum allotments (example two described above with respect to FIG. 4B), the UE 115a will be assigned one or more component carriers within a single allotment. If the supported limited non-contiguous intra-band frequency range W is equal to or greater than the entire range of the frequency allotments, UE 115a can be assigned component carriers from either or both of the allotments. If the supported limited non-contiguous intra-band frequency range W is greater than the gap between frequency allotments plus twice the minimum component carrier width (so that it doesn't embrace the entire range of the allotments but embraces enough to assign component carriers from different allotments), the system may be set up so that UE 115a is assigned carriers from the high frequency end of one allotment and the low frequency end of the other allotment. Alternatively, it might be set up so UE 115a is only assigned component carriers from a single allotment. At 640, the cell communicates with UE 115a.

Base stations 105a and 105b may be in communication with a UE 115b, which has support for full intra-band carrier aggregation. Base station 105a is thus allowed to assign component carriers from any portion of the allotments to UE 115b. In some implementations, the system may be set up so that component carriers are assigned to different UEs in a way that provides more carrier aggregation opportunities for UEs with limited non-contiguous intra-band support. For example, base station 105a may be configured to preferentially assign outer portions of the spectrum allotments to UEs with full intra-band support in order to maximize the chance that a UE with limited intra-band support would be able to use more than one component carrier.

As noted above, another UE capability that is being developed to deal with challenges in the mmW spectrum is the capability to share time and/or frequency tracking information between component carriers. In order to track time and frequency for a particular component carrier, the UE uses information indicative of one or more of the timing offset, channel delay spread, frequency offset, and frequency spread. Without adequate information, it may be difficult for the UE to decode incoming signals to meet performance goals. This can be more challenging in some circumstances, like high multipath environments and in the presence of Doppler shift due to movement of the UE.

In order to track time and frequency, the UE can use signals in the synchronization block (synch block) transmitted from the base station to the UE. In some cases, the synch block includes a primary synchronization signal (PSS), secondary synchronization signal (SSS), and physical broadcast channel (PBCH). The UE can also use a tracking resource signal (TRS) if available. PSS, SSS, PBCH, and TRS are examples of time and frequency tracking information that can be shared between component carriers.

If the UE indicates that it has the capability to share time/frequency tracking information between component carriers, one cell may send time and frequency tracking information for the first component carrier, but a second cell need not send all of the time and frequency tracking information for a second component carrier. Depending on the design, the other cell may send all of the time and frequency information sent by the first cell (e.g., the synch block and the TRS), it may send the synch block or the TRS alone, or it may omit both the synch block and the TRS. The UE may process both component carriers (for example, using a single receive chain) using time and frequency tracking information from the first component carrier.

Figure 7:
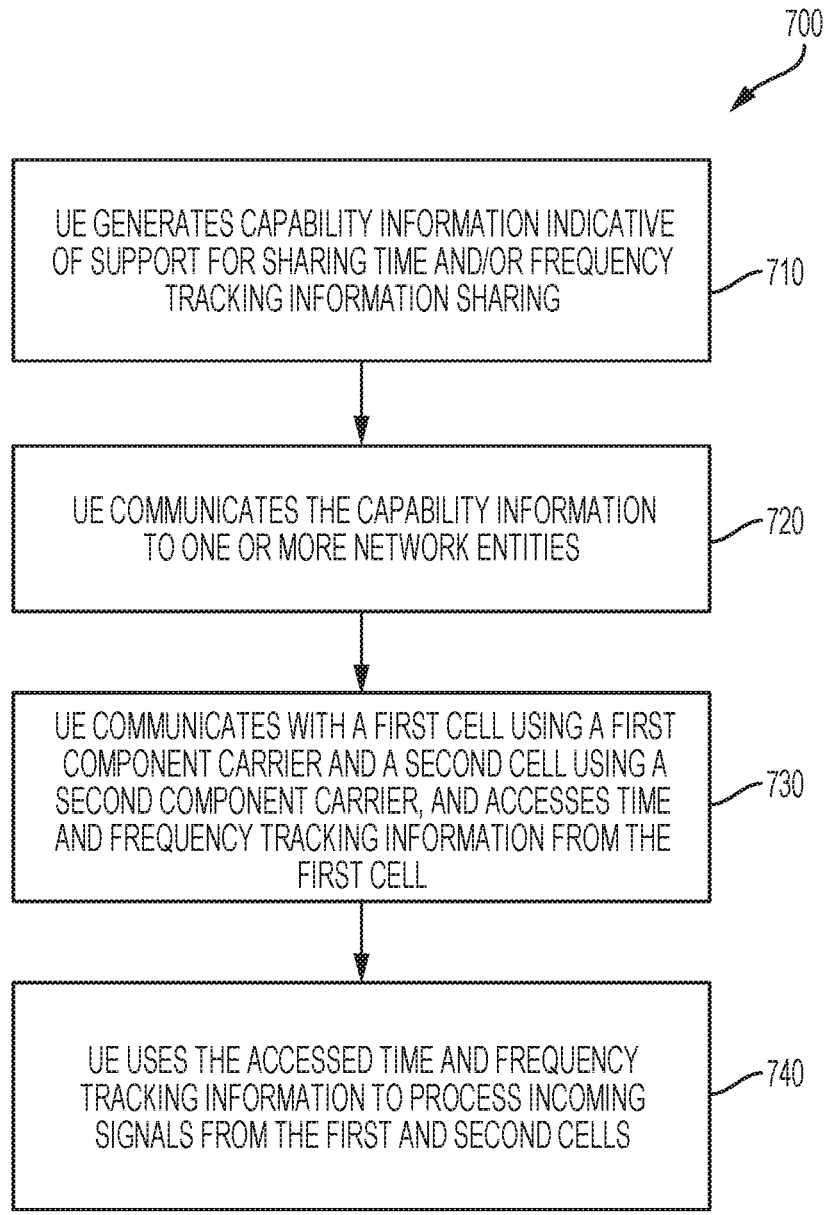
FIG. 7 illustrates an example method for a UE according to some implementations.

FIG. 7 shows a process 700 at a UE such as UE 115, 215 that can be used to enable communication of capability of sharing time tracking information, frequency tracking information, or both. At 710, a UE that is capable of sharing time and frequency tracking generates capability information indicative of its support.

At 720, the UE communicates the capability information to one or more network entities. Like the limited non-contiguous intra-band carrier aggregation capability indication, the UE may communicate the information to a base station as part of a connection protocol (for example, as part of RRC messaging), and in some implementations, the information may be provided to the base station(s) through a network resource that includes stored information about the UE's capabilities.

At 730, the UE is in communication with a first cell using a first component carrier and a second cell using a second component carrier, and accesses time and frequency tracking information from one cell. For example, the UE may access the SSS, PSS, PBCH, and/or TRS. At 740, using the time and frequency tracking information, the UE determines time and frequency information to use to process signals received from the first cell and the second cell (e.g., to decode and demodulate the signals from both the first cell and the second cell). For example, the UE determines a time offset, frequency offset, channel delay spread, and/or frequency spread and uses the information to decode and demodulate the received signals.

Figure 8:
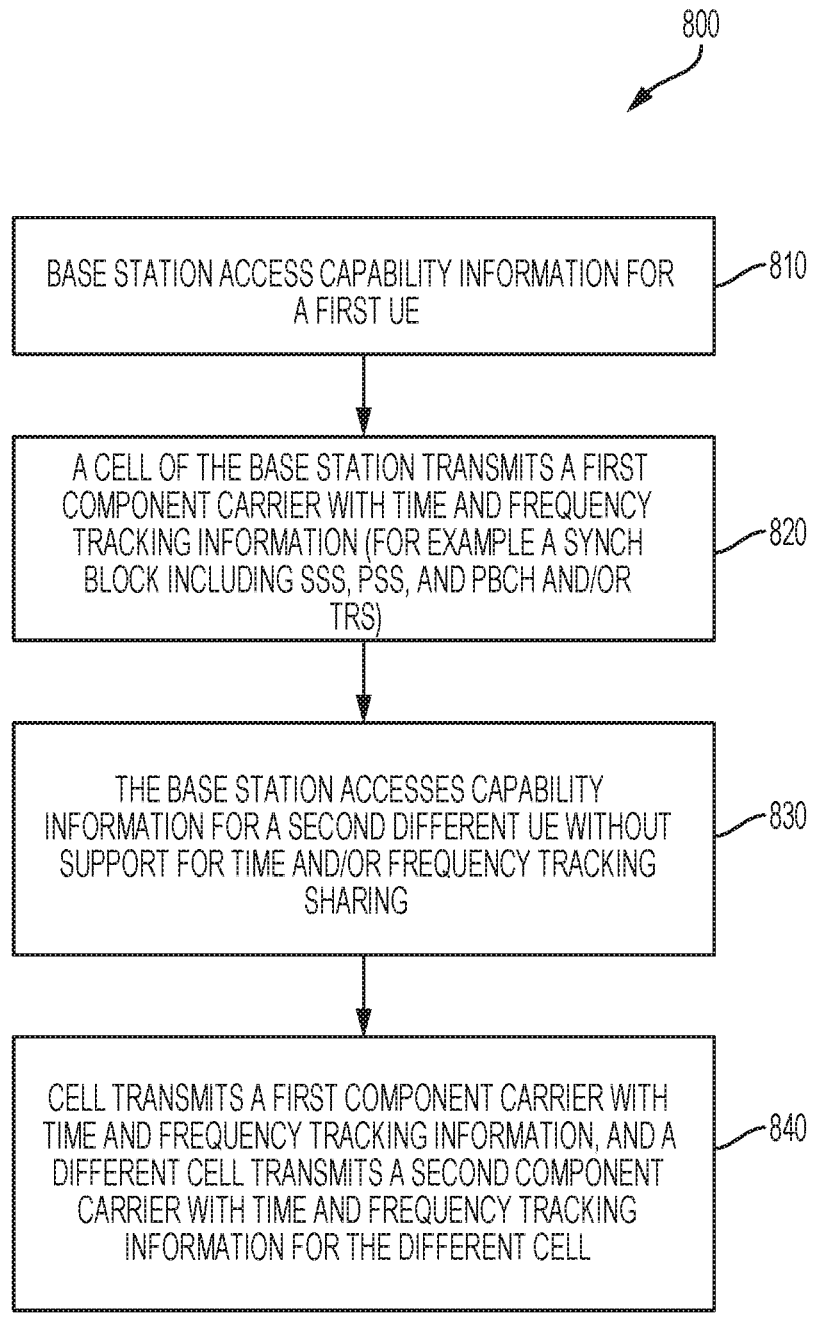
FIG. 8 illustrates an example method for a base station according to some implementations.

FIG. 8 shows a process 800 at a base station such as base station 105a or 105b of FIG. 1 that supports time/frequency tracking sharing in a UE.

At 810, the base station access capability information for a first UE. The capability information may include information indicative of UE support for time and/or frequency tracking sharing for a first UE. The base station can access the information from a message received in control signaling (e.g., RRC signaling), or can access the information based on its earlier receipt at network entity such as one or more base stations. In response, at 820, a cell of the base station may transmit a first component carrier with time and frequency tracking information (for example a synch block including SSS, PSS, and PBCH and/or TRS). A different cell of the base station or a different base station independently transmit the time and frequency tracking information (e.g. a synch block and/or TRS for the different cell), a limited set of time and frequency tracking information for the different cell, or may omit time and frequency tracking information for the different cell, depending on the system design.

At 830, the base station can access capability information for a second different UE. If the capability information does not indicate that the second UE is capable of support for time and/or frequency tracking sharing, at 840 a cell of the base station transmits a first component carrier with time and frequency tracking information, and a different cell of the same or different base station transmits a second component carrier with time and frequency tracking information for the different cell.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for carrier aggregation signaling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication performed by a user equipment (UE), the method comprising:
generating information indicative of support for limited non-contiguous intra-band carrier aggregation, wherein the support for the limited non-contiguous intra-band carrier aggregation is support for a limited frequency range W less than a frequency range L of a particular frequency band; and
communicating the information indicative of the support for limited non-contiguous intra-band carrier aggregation to one or more network entities, wherein communicating the information indicative of the support for limited non-contiguous intra-band carrier aggregation comprises transmitting the information in a control message to a first cell associated with a first base station, wherein the first base station is associated with a service provider with at least a first spectrum allotment and a second spectrum allotment separated by a frequency gap G, the frequency gap G greater than W, and wherein the method further comprises:
receiving an indication of one or more assigned component carriers from the first cell, wherein the one or more assigned component carriers are all included in the first spectrum allotment;
communicating with at least the first cell using the one or more assigned component carriers included in the first spectrum allotment;
communicating with a different cell associated with a different base station after a handoff procedure; and
receiving an indication of one or more assigned component carriers from the different cell, wherein the one or more assigned component carriers are all included in the second spectrum allotment.

2. The method of claim 1, wherein the information indicative of the support for limited non-contiguous intra-band carrier aggregation comprises an indication of a magnitude of the limited frequency range W.

3. The method of claim 2, wherein the indication of the limited frequency range W is an indication of a frequency separation between a lower frequency of a supported lowest component carrier and an upper frequency of a supported highest component carrier in the particular frequency band.

4. The method of claim 1, wherein the information indicative of the support for limited intra-band carrier aggregation comprises an indication that a pre-defined frequency range is supported.

5. The method of claim 1, wherein the information indicative of the support for limited non-contiguous intra-band carrier aggregation comprises an indication of a number of receive processing chains included in transceiver circuitry of the UE.

6. The method of claim 5, wherein the indication of the number of receive processing chains included in the transceiver circuitry of the UE is an indication that the number is less than a number to provide support for full intra-band carrier aggregation support, wherein support for full intra-band carrier aggregation is support for the frequency range L of the particular frequency band.

7. The method of claim 1, wherein communicating the information indicative of the support for limited non-contiguous intra-band carrier aggregation comprises transmitting the information in a Radio Resource Control (RRC) message to the first cell associated with the first base station.

8. The method of claim 1, wherein the first spectrum allotment or the second spectrum allotment or both are associated with a smallest component carrier size greater than the minimum component carrier frequency S, and wherein W is greater than a sum of the smallest component carrier size associated with the first spectrum allotment, the smallest component carrier size associated with the second spectrum allotment, and the gap G between the first spectrum allotment and the second spectrum allotment.

9. A user equipment comprising:
memory circuitry configured to store capability information, the capability information including capability information indicative of support for limited non-contiguous intra-band carrier aggregation, wherein the support for the limited non-contiguous intra-band carrier aggregation is support for a limited frequency range W less than a frequency range L of a particular frequency band;
processor circuitry configured to access the memory circuitry to generate a control message including the capability information for transmission to one or more network entities; and
transceiver circuitry and antenna circuitry to generate and transmit a signal to communicate the capability information in the control message to a first cell associated with a first base station, wherein the first base station is associated with a service provider with at least a first spectrum allotment and a second spectrum allotment separated by a frequency gap G, the frequency gap G greater than W, and wherein the processor circuitry, transceiver circuitry, and antenna circuitry are further configured to:
receive an indication of one or more assigned component carriers from the first cell, wherein the one or more assigned component carriers are all included in the first spectrum allotment;
communicate with at least the first cell using the one or more assigned component carriers included in the first spectrum allotment;
communicate with a different cell associated with a different base station after a handoff procedure; and receive an indication of one or more assigned component carriers from the different cell, wherein the one or more assigned component carriers are all included in the second spectrum allotment.

10. The user equipment of claim 9, wherein the transceiver circuitry and antenna circuitry are configured to generate and transmit a beamformed signal using a millimeter wave band.

11. The user equipment of claim 9, wherein the transceiver circuitry includes one or more receive chains, each of the one or more receive chains including a plurality of radiofrequency processing (RF) components.

12. The user equipment of claim 11, wherein the one or more receive chains is a single receive chain configured to process received signals in the particular frequency band.

13. The user equipment of claim 11, wherein the capability information indicative of the support for limited non-contiguous intra-band carrier aggregation comprises an indication of a frequency separation between a lower frequency of a supported lowest component carrier and an upper frequency of a supported highest component carrier in the particular frequency band.

14. The user equipment of claim 9, wherein the one or more receive chains is a single receive chain configured to process received signals in one or more millimeter wave bands, and wherein the single receive chain is configured to separate a plurality of component carriers in baseband.

15. The user equipment of claim 14, wherein the single receive chain includes a single analog to digital converter (ADC) with an associated supported bandwidth, and wherein W is less than or equal to the supported bandwidth of the ADC.

16. A user equipment comprising:
   means for generating information indicative of support for limited non-contiguous intra-band carrier aggregation, wherein the support for the limited non-contiguous intra-band carrier aggregation is support for a limited frequency range W less than a frequency range L of a particular frequency band;
   means for communicating the information indicative of the support for limited non-contiguous intra-band carrier aggregation to one or more network entities, wherein the means for communicating the information indicative of the support for limited non-contiguous intra-band carrier aggregation comprises means for transmitting the information in a control message to a first cell associated with a first base station, wherein the first base station is associated with a service provider with at least a first spectrum allotment and a second spectrum allotment separated by a frequency gap G, the frequency gap G greater than W;
   means for receiving an indication of one or more assigned component carriers from the first cell, wherein the one or more assigned component carriers are all included in the first spectrum allotment;
   means for communicating with at least the first cell using the one or more assigned component carriers included in the first spectrum allotment;
   means for communicating with a different cell associated with a different base station after a handoff procedure; and
   means for receiving an indication of one or more assigned component carriers from the different cell, wherein the one or more assigned component carriers are all included in the second spectrum allotment.

17. The user equipment of claim 16, wherein the information indicative of support for limited non-contiguous intra-band carrier aggregation includes at least one indication selected from the group consisting of: an indication of a magnitude of the limited frequency range W, an indication that a pre-defined frequency range is supported, and an indication of a number of receive processing chains included in transceiver circuitry of the user equipment.

18. The user equipment of claim 17, wherein the information indicative of support for limited non-contiguous intra-band carrier aggregation includes an indication of the magnitude of the limited frequency range W, and wherein the indication of the limited frequency range W is an indication of a frequency separation between a lower frequency of a supported lowest component carrier and an upper frequency of a supported highest component carrier in the particular frequency band.

* * * * *